(12) United States Patent
Festog et al.

(10) Patent No.: US 7,610,230 B2
(45) Date of Patent: Oct. 27, 2009

(54) METHOD AND SYSTEM FOR EVALUATING THE INVESTMENT RATINGS OF A SECURITIES ANALYST

(75) Inventors: Jeffrey Festog, Jersey City, NJ (US); Angus Lund, London (GB); Melissa Miller, New York, NY (US); Leah Modigliani, New York, NY (US); Corey Ng, Tsuenwan (HK); Daniel G. Patyk, Maplewood, NJ (US); Deborah Bronston, Southampton, NY (US)

(73) Assignee: Morgan Stanley, New York, NY (US)

( * ) Notice: Subject to any disclaimer, the term of this patent is extended or adjusted under 35 U.S.C. 154(b) by 705 days.

(21) Appl. No.: 10/953,844

(22) Filed: Sep. 29, 2004

(65) Prior Publication Data

US 2006/0074785 A1 Apr. 6, 2006

(51) Int. Cl.
*G06Q 40/00* (2006.01)
(52) U.S. Cl. .................................... 705/36 R
(58) Field of Classification Search ............. 705/37, 705/36 R
See application file for complete search history.

(56) References Cited

U.S. PATENT DOCUMENTS

| | | | |
|---|---|---|---|
| 6,510,419 B1 | 1/2003 | Gatto | |
| 2002/0002520 A1 | 1/2002 | Gatto | |
| 2002/0052820 A1 | 5/2002 | Gatto | |
| 2002/0156714 A1 | 10/2002 | Gatto | |
| 2002/0184131 A1* | 12/2002 | Gatto | 705/36 |
| 2003/0065601 A1 | 4/2003 | Gatto | |
| 2003/0065604 A1* | 4/2003 | Gatto | 705/36 |
| 2003/0065605 A1 | 4/2003 | Gatto | |
| 2005/0203896 A1* | 9/2005 | Weild | 707/3 |

OTHER PUBLICATIONS

"StarMine Monitor" Brochure, StarMine Corporation, 2002.*

\* cited by examiner

*Primary Examiner*—James A Kramer
*Assistant Examiner*—Eric T Wong
(74) *Attorney, Agent, or Firm*—K&L Gates LLP (57) ABSTRACT

Systems and methods for measuring the performance of calls on securities by a securities analyst during an evaluation period are disclosed. According to various embodiments, the system may include a performance evaluation module. The performance evaluation module is for determining a value (called the "hit ratio") indicative of the success of the calls by the analyst for securities within a benchmark group of securities within an industry covered by the analyst relative to a benchmark return for the benchmark group for the corresponding call periods of the calls. The hit ratio may be computed as the ratio of the sum of the actual excess returns to the sum of the total available excess returns for each call by the analyst over the call evaluation period. The contributions to the hit ratio by each call may be equally weighted or weighted according to market capitalization of the rated security.

18 Claims, 4 Drawing Sheets

| | | | BENCHMARK GROUP A | | | | | | |
|---|---|---|---|---|---|---|---|---|---|
| | Call Period | | Security Price | | | | | | |
| Call | Start Date | End Date | Rating | Start | End | Total Return (%) | Benchmark Return (%) | Standard Deviation(t) | Low Band(t) | High Band(t) |
| Call 1 - Stock 1 | 9/15/03 | 1/5/04 | E | 26.50 | 28.10 | 6.0 | 10.4 | 11.1 | 5.7 | 15.2 |
| Call 2 - Stock 2 | 9/15/03 | 1/5/04 | E | 28.36 | 32.55 | 15.3 | 10.4 | 11.1 | 5.7 | 15.2 |
| Call 3 - Stock 3 | 9/15/03 | 1/5/04 | E | 38.89 | 38.76 | 0.0 | 10.4 | 11.1 | 5.7 | 15.2 |
| Call 4 - Stock 4 | 9/15/03 | 1/5/04 | E | 28.93 | 33.75 | 17.0 | 10.4 | 11.1 | 5.7 | 15.2 |
| Call 5 - Stock 5 | 9/15/03 | 1/5/04 | O | 21.90 | 21.58 | -1.3 | 10.4 | 11.1 | 5.7 | 15.2 |
| Call 6 - Stock 6 | 9/15/03 | 12/23/03 | O | 31.01 | 35.30 | 14.2 | 9.1 | 11.0 | 4.4 | 13.8 |
| Call 7 - Stock 7 | 9/15/03 | 1/5/04 | O | 51.64 | 64.61 | 25.5 | 10.4 | 11.1 | 5.7 | 15.2 |
| Call 8 - Stock 8 | 9/15/03 | 1/5/04 | E | 24.20 | 28.69 | 19.5 | 10.4 | 11.1 | 5.7 | 15.2 |
| Call 9 - Stock 9 | 9/15/03 | 9/19/03 | U | 37.11 | 36.15 | -2.6 | 2.0 | 3.1 | 0.7 | 3.3 |
| Call 10 - Stock 10 | 9/15/03 | 9/19/03 | O | 64.98 | 66.25 | 2.0 | 2.0 | 3.1 | 0.7 | 3.3 |
| Call 11 - Stock 11 | 9/15/03 | 1/5/04 | U | 27.50 | 32.04 | 16.8 | 10.4 | 11.1 | 5.7 | 15.2 |
| Call 12 - Stock 12 | 9/15/03 | 1/5/04 | E | 26.21 | 24.46 | -6.6 | 10.4 | 11.1 | 5.7 | 15.2 |
| Call 13 - Stock 13 | 9/15/03 | 1/5/04 | E | 23.95 | 21.55 | -10.0 | 10.4 | 11.1 | 5.7 | 15.2 |
| Call 14 - Stock 14 | 9/15/03 | 10/27/03 | E | 20.82 | 18.33 | -11.8 | 3.2 | 8.8 | -0.6 | 7.0 |
| Call 15 - Stock 15 | 9/15/03 | 9/25/03 | O | 60.15 | 58.27 | -3.1 | -1.6 | 1.9 | -3.3 | 0.1 |
| Call 16 - Stock 16 | 9/15/03 | 11/10/03 | E | 33.85 | 33.81 | 0.2 | 7.7 | 10.7 | 3.1 | 12.3 |
| Call 17 - Stock 17 | 9/15/03 | 1/5/04 | U | 62.61 | 73.93 | 18.5 | 10.4 | 11.1 | 5.7 | 15.2 |
| Call 18 - Stock 18 | 9/15/03 | 1/5/04 | E | 11.40 | 14.73 | 29.2 | 10.4 | 11.1 | 5.7 | 15.2 |
| Call 19 - Stock 19 | 9/15/03 | 1/5/04 | E | 29.67 | 34.10 | 15.5 | 10.4 | 11.1 | 5.7 | 15.2 |
| Call 20 - Stock 20 | 9/15/03 | 12/23/03 | E | 19.22 | 23.34 | 23.0 | 9.1 | 11.0 | 4.4 | 13.8 |
| Call 21 - Stock 9 | 9/19/03 | 1/5/04 | E | 36.15 | 38.34 | 6.3 | 8.2 | 10.2 | 3.8 | 12.6 |
| Call 22 - Stock 10 | 9/19/03 | 1/5/04 | E | 66.25 | 67.95 | 2.7 | 8.2 | 10.2 | 3.8 | 12.6 |
| Call 23 - Stock 15 | 9/25/03 | 1/5/04 | B | 58.27 | 69.29 | 19.5 | 12.3 | 10.6 | 7.7 | 16.9 |
| Call 24 - Stock 14 | 10/27/03 | 1/5/04 | O | 18.33 | 19.74 | 7.7 | 7.0 | 9.7 | 2.8 | 11.2 |
| Call 25 - Stock 16 | 11/10/03 | 1/5/04 | O | 33.81 | 35.91 | 6.5 | 2.6 | 7.9 | -0.8 | 6.0 |
| Call 26 - Stock 21 | 12/10/03 | 1/5/04 | E | 21.41 | 23.75 | 10.9 | 4.3 | 4.1 | 2.5 | 6.1 |
| Call 27 - Stock 20 | 12/23/03 | 1/5/04 | U | 23.54 | 23.93 | 1.7 | 1.2 | 3.0 | -0.1 | 2.5 |
| Call 28 - Stock 6 | 12/23/03 | 1/5/04 | E | 35.30 | 36.16 | 2.4 | 1.2 | 3.0 | -0.1 | 2.5 |

Fig. 5 methods for evaluating the investment ratings of a securities analyst.

A securities analyst is a person, employed by a brokerage house or a non-brokerage entity, who studies publicly-traded companies in order to make informed recommendations about either the absolute or relative investment merits of certain securities, such as common stock, issued by the publicly-traded companies. Analysts often specialize in a single industry, and use a wide variety of techniques for researching and making such recommendations. The reports and recommendations they publish may be used by traders, mutual fund managers, portfolio managers and other investors in their investment decision-making processes.

A common approach for measuring a securities analyst's investment rating performance is to compare the performance of a "passive" portfolio of securities, comprising securities covered by the analyst, against the performance of an "active" portfolio, comprising the securities covered by the analyst weighted according to the analyst's investment rating for each security. For example, "strong buy" recommendations may be weighted twice as heavily as "buy" recommendations. Similarly, "strong sell" recommendations may be weighted twice as heavily as "sell" recommendations. The outcome of the comparison of the "passive" versus "active" portfolios is a metric that provides some indication of the analyst's investment rating performance.

There are, however, drawbacks to this traditional performance evaluation methodology, most notably the difficulty in comparing the investment rating performance of one analyst to another. The conventional "active" versus "passive" performance analysis is heavily affected by the volatility of the analyzed securities: the more widely dispersed the returns among the analyzed stocks, the greater the opportunity to score well. The active versus passive measurement does not account for this volatility, making the comparison of analysts covering industries with different return and volatility characteristic not meaningful. Also, because of the absolute nature of the conventional "active" versus "passive" performance analysis, comparisons of investment rating performance from year-to-year for a particular analyst are not very meaningful. Other drawbacks of the active versus passive approach include (i) lack of transparency (it is difficult to understand the degree to which a call on a given security contributes to the overall measure of performance), (ii) inflexibility to accommodate or consider alternate benchmarks, such as country or region, for evaluating performance, and (iii) the measurement is not outcome-based (a call on a given stock is compared to the benchmark at arbitrary points in time).

SUMMARY OF THE INVENTION

In one general respect, embodiments of the present invention are directed to systems and methods for measuring the performance of calls (i.e., ratings for a given time period) on securities by a securities analyst during an evaluation period. According to various embodiments, the system may include a performance evaluation module. The performance evaluation module is for determining a value (referred to herein as the "hit ratio") indicative of the aggregate success of all of the individual calls by the analyst during the evaluation period for calls on securities covered by the analyst within a benchmark group of securities relative to a benchmark return for the corresponding call periods of the calls. The benchmark return may correspond to the return for the benchmark group of securities within the industry, country or region considered most appropriate. A country or regional based benchmark may be more appropriate, for example, in areas of the world where investment performance is more commonly benchmarked against such indices.

According to various implementations, the value indicative of the success of the calls may be computed as the ratio of the sum of the "actual" excess returns (the formula for which varies based on the rating) to the sum of the "total available" excess returns for each call by the analyst over the evaluation period. Further, the performance evaluation module may make an adjustment to the value to accommodate calls by the analyst that a security of the benchmark group will perform at or around the benchmark return during the call period. In addition, in calculating the hit ratio, the contribution of each call to the hit ratio can be either treated equally or weighted based on the market capitalization ("market cap") of the underlying stock.

DESCRIPTION OF THE FIGURES

Embodiments of the present invention are described by way of example in conjunction with the following figures, wherein:

FIG. 3 is a chart of an example of the performance of a series of calls by an analyst and the performance of the related benchmark group during an evaluation period;

DETAILED DESCRIPTION

Figure 1:
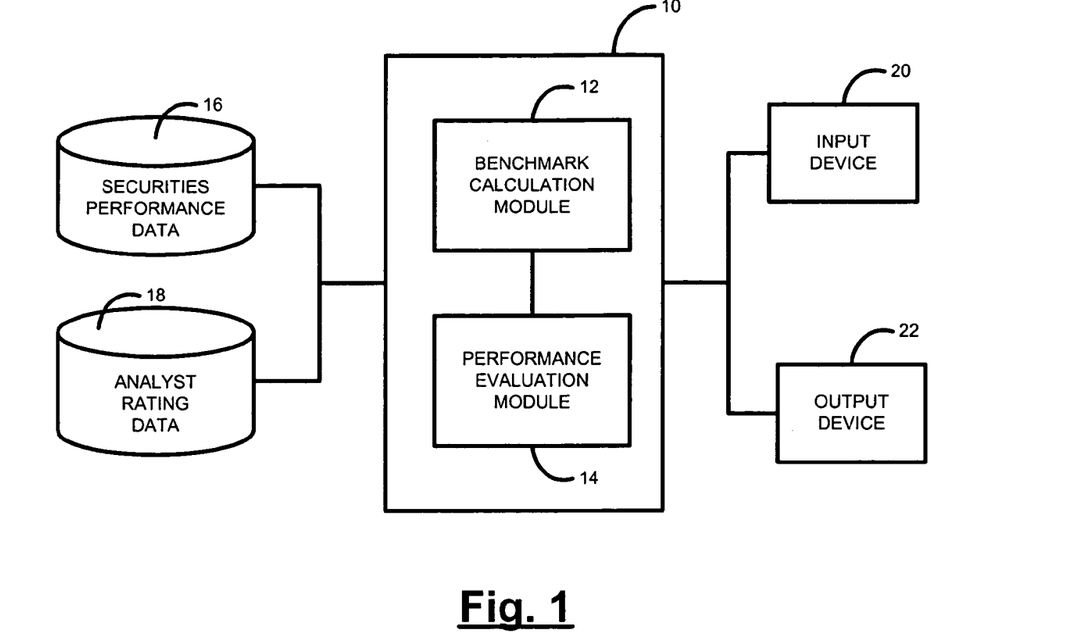
FIG. 1 is a block diagram of a system for measuring the performance of analyst investment ratings according to various embodiments of the present invention.

FIG. 1 is a diagram of a system 10 for measuring (or evaluating) the investment rating performance of a securities analyst according to various embodiments of the present invention. As used herein, a "call" is a rating by the analyst for a security for a given time period. For example, in one type of rating system, the analyst may rate Security A as "Overweight" on a first date and then change the rating for Security A to "Equal-Weight" on a second date. The analyst's call, therefore, for Security A from the first date to the second date would be "Overweight," and the analyst's call from the second date until the date of the next rating change would be "Equal-Weight." Each new rating (and corresponding call) made within the evaluation time period by the analyst may be treated as a new investment opportunity within the group of securities within a given industry that the analyst covers (the "benchmark group"). In addition, the system 10 may treat the analyst's existing ratings (and corresponding calls) on securities at the inception of the evaluation time period as a new investment opportunity within the group. The "evaluation period" is the period over which the analyst's calls are evaluated, and may have various durations ranging from a few months to multiple years. The system 10 may measure the success of each call by comparing the return for the call to a benchmark return for the benchmark group over the call period. The "call period" is the time period during which an analyst has a particular rating for a security in the group. The call period for a call may begin, according to various embodiments, on the day of the published rating change or the first day of the evaluation period. For purposes of evaluating the performance of the call, the price of the security at the beginning of the call period may be the closing price on the day of the published rating change (or the start of the evaluation period for securities where the analyst's rating is an existing (i.e., unchanged) rating from the previous evaluation period).

The analyst need not cover every security in the benchmark group of securities. According to various embodiments, the benchmark group may include securities from entities within the same industry and/or geographic region as the securities covered by the analyst. The benchmark group may include, for example, securities that the analyst is restricted from covering, as well as securities covered by other analysts.

As shown in FIG. 1, the system 10 includes a benchmark calculation module 12 and a performance evaluation module 14. As described further below, the benchmark calculation module 14 may compute the benchmark return for the benchmark group of securities in the industry and/or region covered by the analyst. The benchmark calculation module 14 may also compute the standard deviation of the returns of all of the securities within the benchmark group over a given call period. The benchmark calculation module 14 may perform these calculations based on data regarding the performance of the benchmark group of securities stored in a securities performance database 16. The database 16 may store, for example, data regarding the price of the security on the close of each trading day and the number of shares of the security outstanding.

The performance evaluation module 14 may compute a value (referred to herein as the "hit ratio") indicative of the analyst's performance in recommending positions (e.g., the various ratings in the rating system used by the analyst) for the covered securities of the benchmark group. The performance evaluation module 14 may perform this calculation based on the calculations of the benchmark calculation module 12 and data regarding the analyst's recommendations (e.g., calls), which may be stored in an analyst rating database 18. The database 18 may store, for example, data on the respective calls by the analyst, such as the particular rating, when the rating was initiated, and when the rating was changed.

The system 10 may be implemented as a computing device such as, for example, a network server, a personal computer (PC), a laptop computer, a workstation, a pocket PC, etc. The system 10 may also include a network of such computing devices. The modules 12, 14 may be implemented as software code to be executed by a processor (not shown) of the system 10 using any type of computer instruction type suitable such as, for example, Java, C, C++, Visual Basic, etc., using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM. According to one embodiment, the modules 12, 14 may be distributed across a number of interconnected computing devices.

The performance evaluation module 14 may be run to calculate the investment rating performance of analysts as often as desired. For example, it may be run periodically, such as every day, every two days, etc. The most up-to-date prices for the securities are preferably used in the calculation.

As used herein, the term "security" refers to an investment instrument issued by a corporation, government, or other organization which offers evidence of debt or equity. Examples of securities that a securities analyst may cover include common stock, convertible debt or straight debt in a publicly traded company. An analyst typically covers securities within an industry sector. Examples of industries include, but are not limited to, aerospace and defense, biotechnology, pharmaceuticals, insurance, media, telecommunications services and software. Each industry may have varying degrees of volatility. Multiple analysts may cover various securities in an industry.

The system 10 may be in communication with an input device 20 and an output device 22. The input device 20 may be any device used for inputting data to the system 10, such as a keyboard, mouse, etc., and may be used, for example, to input the name or other identifier of the analyst to be evaluated. The output device 22 may be any device capable of displaying data generated by the system 10, such as, for example, a monitor, a printer, etc.

Figure 2:
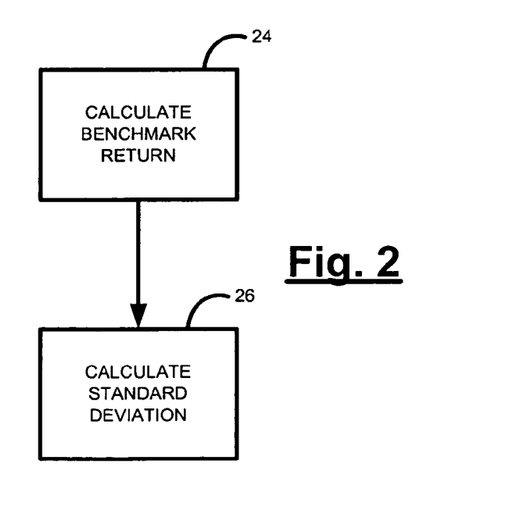
FIG. 2 is a diagram of the process flow through the benchmark calculation module of the system of FIG. 1 according to various embodiments of the present invention.

FIG. 2 is a diagram of the process flow through the benchmark calculation module 12 according to various embodiments of the present invention. At block 24, the module 12 calculates the benchmark return for the benchmark group of securities. The benchmark return is the return, over a particular call period, of a hypothetical portfolio of securities in the same industry, and/or geographic region as the securities covered by the analyst. As mentioned previously, the benchmark group may include additional securities beyond the ones covered by the analyst, including securities that the analyst is restricted from covering and securities covered by other analysts in the same sector. Each security in the benchmark group may be equally weighted in computing the benchmark return, or they may be weighted according to market capitalization, or any other type of weighting.

The chart of FIG. 3 is an example of how the system 10 may operate to evaluate the investment rating performance of an analyst. In this example, the benchmark group includes twenty-one (21) securities and the analyst uses three different ratings for the securities: an Overweight (O) rating indicates a security that the analyst picks to outperform the benchmark; an Equal-Weight (E) rating indicates a security that the analyst picks to perform at or around the benchmark; and an Underweight (U) rating indicates a security that the analyst picks to perform below the benchmark. For other embodiments of the invention, the analyst may employ different ratings and a different number of ratings. In this example, the analyst also has a rating for each security in the benchmark group. In some instances, the analyst may not rate every security in the benchmark group (e.g., another analyst may rate that security or that security may be on a restricted list) and the unrated securities may nonetheless be included in the calculation of the benchmark return. Also, it should be noted that in this example, the analyst's rating for Stock 21 began in the middle of the evaluation period.

As can been seen, the benchmark return may be calculated for each separate call period of the evaluation period. For the example of FIG. 3, the evaluation period is Sep. 15, 2003 to Jan. 5, 2004. This time period corresponds to a call period as well because for at least some of the securities (i.e., Stocks 1-5, 7, 8, 11-13 and 17-19) the analyst did not change the rating during the evaluation period. There are several other call periods within this evaluation period. For example, on Dec. 23, 2003 the analyst changed the recommendation of Stock 6 from Overweight (O) to Equal-Weight (E). The analyst also changed the recommendation for Stock 9 on Sep. 19, 2003 from Underweight (U) to Equal-Weight (E). The analyst also changed the recommendations for Stocks 10, 14, 15, 16, and 20 at some point during the evaluation period. There are 12 total call periods in the example of FIG. 3, and 28 total calls. The benchmark return for each call period during the evaluation period in this example is:

TABLE 1

| Call Period | Benchmark Return (%) |
|---|---|
| Sep. 15, 2003 to Jan. 5, 2004 | 10.4 |
| Sep. 15, 2003 to Dec. 23, 2003 | 9.1 |
| Sep. 15, 2003 to Sep. 19, 2003 | 2.0 |
| Sep. 15, 2003 to Oct. 27, 2003 | 3.2 |
| Sep. 15, 2003 to Sep. 25, 2003 | −1.6 |
| Sep. 15, 2003 to Nov. 10, 2003 | 7.7 |
| Sep. 19, 2003 to Jan. 5, 2004 | 8.2 |
| Sep. 25, 2003 to Jan. 5, 2004 | 12.3 |
| Oct. 27, 2003 to Jan. 5, 2004 | 7.0 |
| Nov. 10, 2003 to Jan. 5, 2004 | 2.6 |
| Dec. 10, 2003 to Jan. 5, 2004 | 4.3 |
| Dec. 23, 2003 to Jan. 5, 2004 | 1.2 |

According to some embodiments, as shown in FIG. 2, the process flow of the benchmark calculation module 12 may proceed to block 26, wherein the benchmark calculation module 12 may compute, for each call period in the evaluation period, the standard deviation of the returns of all of the securities within the benchmark group over each call period.

Figure 4:
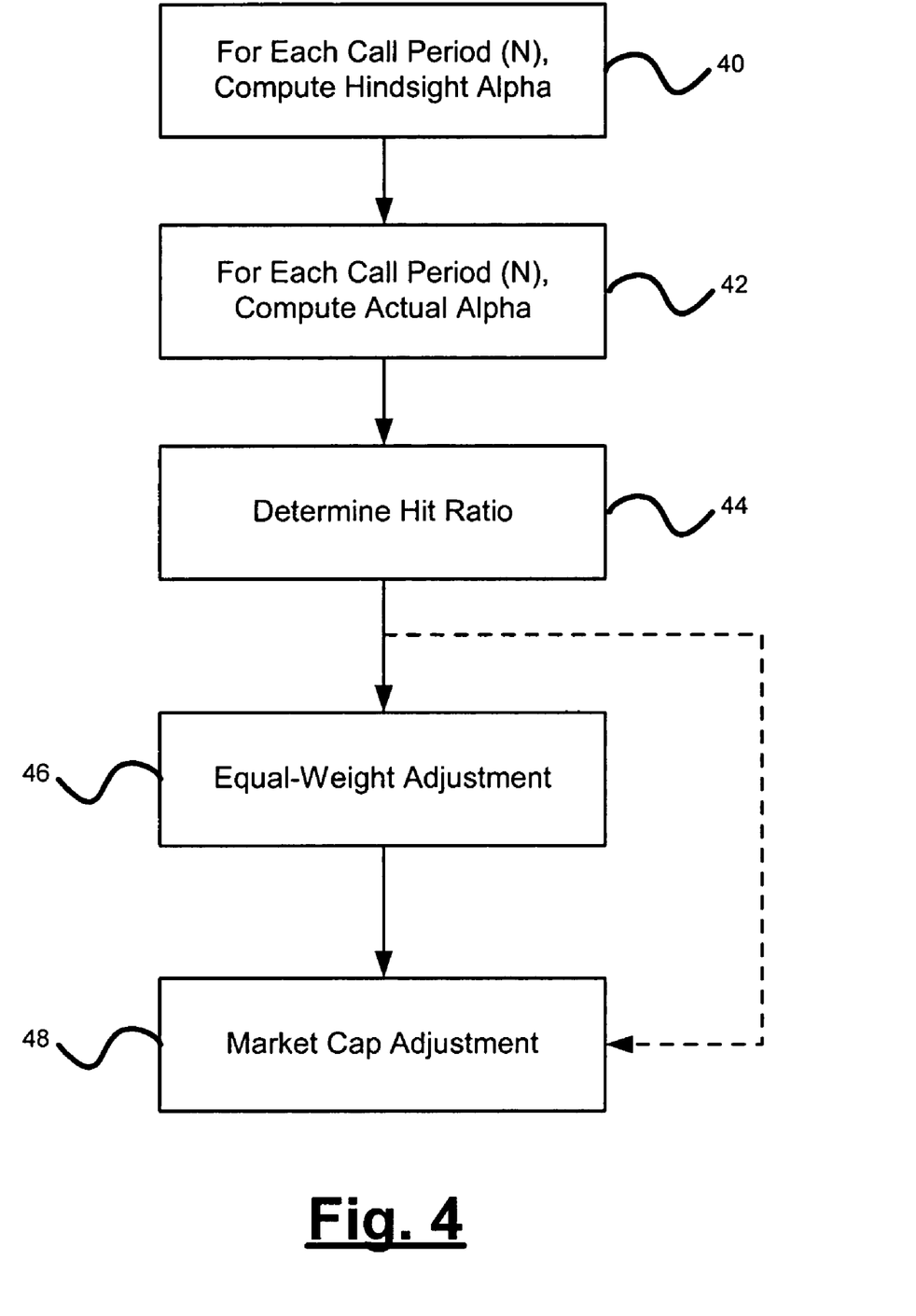
FIG. 4 is a diagram of the process flow through the performance evaluation module according to various embodiments of the present invention.

FIG. 4 is a diagram of the process flow through the performance evaluation module 14 according to various embodiments of the present invention. The process initiates at block 40, where the performance evaluation module 14 computes a "hindsight alpha" for each call during the evaluation period. The hindsight alpha, according to various embodiments, corresponds to the total available excess return associated with the new investment opportunity of each call and equals the absolute value of the difference between the return on the security and the benchmark return for the call period. For example, in the example of FIG. 3, the hindsight alpha for Stock 6 over the call period from Sep. 15, 2003 to Dec. 23, 2003 equals 5.1 (i.e., abs(14.2-9.1)). The total available alpha over the evaluation period is the sum of the hindsight alphas for all of the calls made during the evaluation period.

Next, at block 42 the performance evaluation module 14 may compute the "actual alpha" for each call of the evaluation period. The actual alpha measures the actual excess return that could have been earned (or lost) by following the analyst's call recommendation for the security over the call period. For a rating system of Overweight (O), Equal-Weight (E), and Underweight (U), the actual alpha for a given call may be computed as follows:

TABLE 2

| Rating | Actual Alpha |
|---|---|
| Overweight | Stock Return-Benchmark Return |
| Equal Weight | 0 |
| Underweight | Benchmark Return-Stock Return |

Different mechanisms for computing the actual alpha may be used for different rating systems as appropriate.

Next, at block 44 the performance evaluation module 14 may compute the hit ratio for the analyst for the evaluation period. The hit ratio represents the percentage of total available alpha earned based on the analyst's calls over the evaluation period. Hit ratios can therefore range from −1.0 (−100%) to +1.0 (+100%), with a higher value indicating better analyst stock rating performance. The overall analyst hit ratio may be calculated as the ratio of the sum of the actual alphas to the sum of the hindsight alphas, over the evaluation period. That is:

$$\frac{\sum_{n=1}^{N} ActualAlpha_n}{\sum_{n=1}^{N} HindsightAlpha_n}$$

for each call n, where N is the total number of calls.

Figure 5:
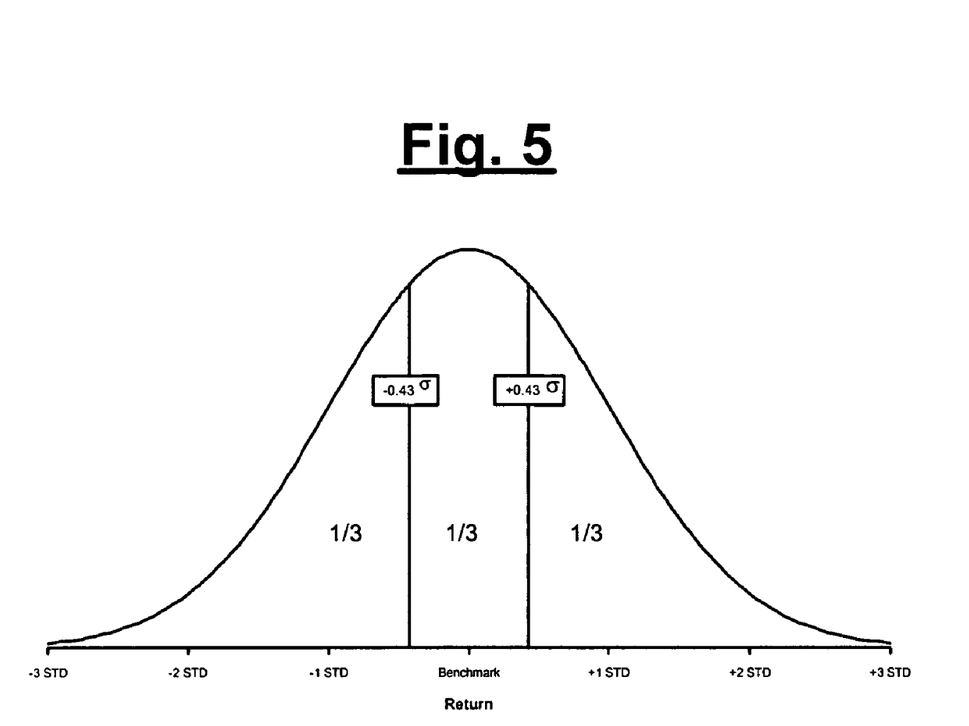
FIG. 5 is a distribution curve showing a band around the benchmark return.

In rating systems where one of the ratings is used to indicate securities that are predicted to perform at or around the benchmark return, such as "Equal-Weight" in the above-mentioned rating system, the performance evaluation module 14 may make an adjustment for such ratings in order that the analyst may not be penalized for accurately rating a security as performing at or around the benchmark return. In such an embodiment, the process flow may advance to block 46 where the performance evaluation module 14 may make an Equal-Weight (or similar rating in a different rating system) adjustment. According to one embodiment, the Equal-Weight rating may be accommodated by creating a band around the benchmark return that defines a range where each Equal-Weight rating can be considered 100% correct. The upper and lower ends of the band may be based on the dispersion of the returns of the securities within the benchmark group over each call period. For example, assuming a normal distribution curve, in order to get, for example, one-third of the returns to fall within the central (i.e., Equal-Weight) band, the band limits may be set as plus/minus some factor (x=0.43 in this case) times the standard deviation of the returns of the securities within the benchmark, as shown in FIG. 5.

Referring to the example of FIG. 3, the benchmark return for Stock 1 is 10.4% and the standard deviation is 11.1%. Using x=0.43, the high and low bands would be set at 15.2% (computed as 10.4% plus the product of 0.43 and 11.1%) and 5.6% (computed as 10.4% minus the product of 0.43 and 11.1%) respectively. Thus, for the example of Stock 1 in FIG. 3, because the analyst rated Stock 1 as Equal-Weight (E), and the return of the stock (6.0%) was within the band around the benchmark return (5.6% to 15.2%), hindsight alpha for this call may be set equal to zero and the analyst may be considered to be 100% correct for this call.

The hindsight alphas for the analyst's Equal-Weight recommendations for Stocks 2 and 3 in the example of FIG. 3 would not be adjusted to equal zero because they performed outside of the Equal-Weight band (Stock 2 above the band and Stock 3 below the band). The hindsight alpha for these calls may be computed as the absolute value of the difference between the return for these stocks minus the benchmark return, as explained above. Alternatively, the hindsight alpha may be computed as the absolute value of the difference between the return for these stocks minus the low band (for under-performing stocks, such as Stock 3) or the high band (for over-performing stocks, such as Stock 2), as shown in the Table 3, below.

Table 3 is a chart showing the actual alpha and the hindsight alpha for the securities of the example of FIG. 3 using the latter of the two above-described Equal-Weight adjustments:

TABLE 3

| Call | Rating | Total Return (%) | Benchmark Return (%) | Low Band (%) | High Band (%) | Actual Alpha (BPS) | Hindsight Alpha (BPS) |
|---|---|---|---|---|---|---|---|
| Call 1 - Stock 1 | E | 6.0 | 10.4 | 5.6 | 15.2 | 0 | 0 |
| Call 2 - Stock 2 | E | 15.3 | 10.4 | 5.6 | 15.2 | 0 | 10 |
| Call 3 - Stock 3 | E | 0.0 | 10.4 | 5.6 | 15.2 | 0 | 560 |
| Call 4 - Stock 4 | E | 17.0 | 10.4 | 5.6 | 15.2 | 0 | 180 |
| Call 5 - Stock 5 | O | −1.3 | 10.4 | 5.6 | 15.2 | −1,171 | 1,171 |
| Call 6 - Stock 6 | O | 14.2 | 9.1 | 4.4 | 13.8 | 510 | 510 |
| Call 7 - Stock 7 | O | 25.5 | 10.4 | 5.6 | 15.2 | 1,508 | 1,508 |
| Call 8 - Stock 8 | E | 19.5 | 10.4 | 5.6 | 15.2 | 0 | 426 |
| Call 9 - Stock 9 | U | −2.6 | 2.0 | 0.7 | 3.3 | 463 | 463 |
| Call 10 - Stock 10 | O | 2.0 | 2.0 | 0.7 | 3.3 | −8 | 8 |
| Call 11 - Stock 11 | U | 16.8 | 10.4 | 5.6 | 15.2 | −635 | 635 |
| Call 12 - Stock 12 | E | −6.6 | 10.4 | 5.6 | 15.2 | 0 | 1,228 |
| Call 13 - Stock 13 | E | −10.0 | 10.4 | 5.6 | 15.2 | 0 | 1,560 |
| Call 14 - Stock 14 | E | −11.8 | 3.2 | −0.6 | 7.0 | 0 | 1,127 |
| Call 15 - Stock 15 | O | −3.1 | −1.6 | −3.3 | 0.1 | −150 | 150 |
| Call 16 - Stock 16 | E | 0.2 | 7.7 | 3.1 | 12.3 | 0 | 291 |
| Call 17 - Stock 17 | U | 18.5 | 10.4 | 5.6 | 15.2 | −805 | 805 |
| Call 18 - Stock 18 | E | 29.2 | 10.4 | 5.6 | 15.2 | 0 | 1,402 |
| Call 19 - Stock 19 | E | 15.5 | 10.4 | 5.6 | 15.2 | 0 | 30 |
| Call 20 - Stock 20 | E | 23.0 | 9.1 | 4.4 | 13.8 | 0 | 915 |
| Call 21 - Stock 9 | E | 6.3 | 8.2 | 3.8 | 12.6 | 0 | 0 |
| Call 22 - Stock 10 | E | 2.7 | 8.2 | 3.8 | 12.6 | 0 | 119 |
| Call 23 - Stock 15 | E | 19.5 | 12.3 | 7.7 | 16.9 | 0 | 265 |
| Call 24 - Stock 14 | O | 7.7 | 7.0 | 2.8 | 11.2 | 73 | 73 |
| Call 25 - Stock 16 | O | 6.5 | 2.6 | −0.8 | 6.0 | 393 | 393 |
| Call 26 - Stock 21 | E | 10.9 | 4.3 | 2.5 | 6.1 | 0 | 489 |
| Call 27 - Stock 20 | U | 1.7 | 1.2 | −0.1 | 2.5 | −41 | 41 |
| Call 28 - Stock 6 | E | 2.4 | 1.2 | −0.1 | 2.5 | 0 | 0 |
| Total | | | | | | 135 | 14,360 |

Thus, the analyst's hit ratio for this example is 0.0094 (or 0.94%), computed as 135/14,360. It should be noted that, for the sake of convenience, in the example of Table 3 the bands for the benchmark returns are rounded to the nearest tenth of a percent and that there is an extra digit of accuracy in the Actual Alpha and Hindsight Alpha.

Other techniques may be utilized to make the Equal-Weight adjustment. For example, for each call period, all of the securities in the benchmark group may be ranked by return performance. The top third (for a 3-ranking rating system) may be considered to have performed overweight, the middle third equal-weight, and the bottom third underweight. If the analyst ranked as Equal-Weight a security that performed in the middle third of the group during the call period, the actual and hindsight alphas would be equal according to this adjustment technique.

In the above example, each call is weighted equally. According to other embodiments, each call is not weighted equally. For example, the performance evaluation module 14 may also make an adjustment, at block 48 to the hit ratio, based on market capitalization ("market cap"). The market cap adjustment may be done in conjunction with the Equal-Weight adjustment or without the Equal-Weight adjustment. For one embodiment of the market cap adjustment, each call is weighted by the market cap of the underlying security at the start of the call, divided by the sum of the starting market caps at the start of the call for all securities of the group. Below is a table showing the equally weighted actual alpha and hindsight alpha versus the market cap adjusted actual alpha and hindsight alpha for the example of FIG. 3:

TABLE 4

| Call | Rating | Market Cap | Equally Weighted | | Market Cap Adjusted | | |
|---|---|---|---|---|---|---|---|
| | | | Actual Alpha | Hindsight Alpha | Weight | Actual Alpha | Hindsight Alpha |
| Call 1 - Stock 1 | E | 2,086 | 0 | 0 | 1.1 | 0 | 0 |
| Call 2 - Stock 2 | E | 10,568 | 0 | 10 | 5.7 | 0 | 1 |
| Call 3 - Stock 3 | E | 3,286 | 0 | 560 | 1.8 | 0 | 10 |
| Call 4 - Stock 4 | E | 1,435 | 0 | 180 | 0.8 | 0 | 1 |
| Call 5 - Stock 5 | O | 1,963 | −1,171 | 1,171 | 1.1 | −12 | 12 |
| Call 6 - Stock 6 | O | 6,627 | 510 | 510 | 3.6 | 18 | 18 |
| Call 7 - Stock 7 | O | 10,023 | 1,508 | 1,508 | 5.4 | 82 | 82 |
| Call 8 - Stock 8 | E | 3,842 | 0 | 426 | 2.1 | 0 | 9 |
| Call 9 - Stock 9 | U | 3,877 | 463 | 463 | 2.1 | 10 | 10 |
| Call 10 - Stock 10 | O | 19,386 | −8 | 8 | 10.5 | −1 | 1 |
| Call 11 - Stock 11 | U | 683 | −635 | 635 | 0.4 | −2 | 2 |
| Call 12 - Stock 12 | E | 1,311 | 0 | 1,228 | 0.7 | 0 | 9 |

TABLE 4-continued

| Call | Rating | Market Cap | Equally Weighted | | Market Cap Adjusted | | |
|---|---|---|---|---|---|---|---|
| | | | Actual Alpha | Hindsight Alpha | Weight | Actual Alpha | Hindsight Alpha |
| Call 13 - Stock 13 | E | 2,010 | 0 | 1,560 | 1.1 | 0 | 17 |
| Call 14 - Stock 14 | E | 1,660 | 0 | 1,127 | 0.9 | 0 | 10 |
| Call 15 - Stock 15 | O | 15,283 | −150 | 150 | 8.3 | −12 | 12 |
| Call 16 - Stock 16 | E | 914 | 0 | 291 | 0.5 | 0 | 1 |
| Call 17 - Stock 17 | U | 32,150 | −805 | 805 | 17.4 | −140 | 140 |
| Call 18 - Stock 18 | E | 703 | 0 | 1,402 | 0.4 | 0 | 5 |
| Call 19 - Stock 19 | E | 1,862 | 0 | 30 | 1.0 | 0 | 0 |
| Call 20 - Stock 20 | E | 7,492 | 0 | 915 | 4.0 | 0 | 37 |
| Call 21 - Stock 9 | E | 3,782 | 0 | 0 | 2.0 | 0 | 0 |
| Call 22 - Stock 10 | E | 19,765 | 0 | 119 | 10.7 | 0 | 13 |
| Call 23 - Stock 15 | E | 14,805 | 0 | 265 | 8.0 | 0 | 21 |
| Call 24 - Stock 14 | O | 1,461 | 73 | 73 | 0.8 | 1 | 1 |
| Call 25 - Stock 16 | O | 915 | 393 | 393 | 0.5 | 2 | 2 |
| Call 26 - Stock 21 | E | 594 | 0 | 489 | 0.3 | 0 | 2 |
| Call 27 - Stock 20 | U | 9,185 | −41 | 41 | 5.0 | −2 | 2 |
| Call 28 - Stock 6 | E | 7,553 | 0 | 0 | 4.1 | 0 | 0 |
| Total Market Cap | | 185,221 | | Market Cap Adjusted Total | | −58 | 418 |

Thus, the analyst's market cap adjusted hit ratio in this example is −0.139 (or −13.9%), computed as −58/418.

In another embodiment, the Equal-Weight (or another rating used in another rating system used to indicate securities that will perform at or around the benchmark return) band may correspond to a predetermined percentage around the benchmark return. That is, for example, the upper limit of the Equal-Weight band may be set as the benchmark return plus x % and the lower limit may be set as the benchmark return minus x %.

In addition, the above-described evaluation framework may be extended to measure the investment rating performance of multiple analysts. In such cases, the hit ratio calculation would be extended to include the calls of the additional analysts. That is, overall hit ratio would be the ratio of the sum of the actual alphas for all of the analysts to the sum of the hindsight alphas for all of the analysts, for each call by the analysts. Thus, for example, the combined hit ratio of multiple analysts covering a particular sector for a single brokerage firm may be determined to measure the performance of that brokerage house for that sector. That score may be compared to scores from other brokerage firms for the same sector. Also, the combined hit ratio by analysts covering different sectors may be determined so that, for example, the combined hit ratio of all of the analysts at a particular firm may be determined.

Referring back to FIG. 1, a user of the system 10 may enter a name or other identifier for the analyst to be evaluated via the input device 20. The output device 22 may display, among other things, the calculated hit ratio (whether the calls are equally weighted or market-cap weighted) determined by the system 10.

While several embodiments of the present invention have been described herein, it should be apparent that various modifications, alterations and adaptations to those embodiments may occur to persons skilled in the art. For example, the steps illustrated in the process flows may be performed in various orders. It is therefore intended to cover all such modifications, alterations and adaptations without departing from the scope and spirit of the present invention as defined by the appended claims.

What is claimed is:

1. A system for measuring the performance of calls on securities by a securities analyst during an evaluation period, comprising:

a computer device comprising a processor and a memory, wherein the memory stores instructions that are executed by the processor such that the computer device is programmed to calculate an analyst overall performance value indicative of the success of the calls by the analyst during the evaluation period for securities within a benchmark group of securities, wherein call ratings available to the analyst for each security in the benchmark group comprise a first call rating, a second call rating, and a third call rating, wherein the computer device calculates the analyst overall performance value by:

computing a benchmark return for the benchmark group for each call period during the evaluation period, wherein a call period corresponds to a time period during the evaluation period during which the analyst has a particular rating for a security in the benchmark group, such that there are multiple call periods during the evaluation period when the analyst changes the rating on one or more securities in the benchmark group during the evaluation period;

computing a total available excess return for each call by the analyst during the evaluation period, wherein the total available excess return for each call is based on an absolute difference of (i) a return of the security for the call during the call period for the call and (ii) the benchmark return for the call period, except that the total available excess return equals zero for each call by the analyst having the second call rating during the call period when the security performs within a band around the benchmark return for the call period;

computing a sum of the total available excess returns for each call;

computing a call success value for each call by the analyst during the evaluation period, wherein the call success value for each call is based on a return of the security during the call period of the call to the benchmark return during the call period;

computing a sum of the call success values for each call; and computing the analyst overall performance value indicative of the success of the calls by the analyst during the evaluation period based on a ratio of (i) the sum of call success values to (ii) the sum of total available excess returns for each call by the analyst over the evaluation period, wherein:

for each call having the first call rating for one of the securities, the call success value for the call is related to the return on the security for the call period minus the benchmark return for the call period;

for each call having the second call rating for one of the securities, the call success value for the call is zero; and for each call having the third call rating for one of the securities, the call success value for the call is related to the benchmark return for the call period minus the return on the security for the call period.

2. The system of claim 1, wherein the computer device is programmed to calculate the analyst overall performance value by weighting the contribution of each call according to market capitalization of the rated security.

3. The system of claim 1, wherein the computer device is programmed to calculate the analyst overall performance value by equally weighting the contribution of each call.

4. The system of claim 1, wherein the computer device is further programmed to:

compute the standard deviation of the returns of the securities in the benchmark group for each call period of the evaluation period; and compute the band around the benchmark return for each call period based on the computed standard deviation.

5. The system of claim 1, wherein the benchmark group of securities include securities within an industry sector covered by the analyst.

6. A computer-implemented method for measuring the performance of calls on securities by a securities analyst during an evaluation period, comprising:

determining, by a computer system that comprises a processor and memory that stores instructions to be executed by the processor, a benchmark return for a benchmark group of securities for each call period of the evaluation period, wherein a call period corresponds to a time period during the evaluation period during which the analyst has a particular rating for a security in the benchmark group, such that there are multiple call periods during the evaluation period when the analyst changes the rating on one or more securities in the benchmark group during the evaluation period, wherein calls ratings available to the analyst for each security in the benchmark group comprise a first call rating, a second call rating, and a third call rating;

computing, by the computer system, a total available excess return for each call by the analyst during the evaluation period, wherein the total available excess return for each call is based on an absolute difference of (i) a return of the security for the call during the call period for the call and (ii) the benchmark return for the call period, except that the total available excess return equals zero for each call by the analyst having the second call rating during the call period when the security performs within a band around the benchmark return for the call period;

computing, by the computer system, a sum of the total available excess returns for each call;

computing, by the computer system, a call success value for each call by the analyst during the evaluation period, wherein the call success value for each call is based on a return of the security during the call period of the call to the benchmark return during the call period;

computing, by the computer system, a sum of the call success values for each call; and computing, by the computer system, an analyst overall performance value indicative of the success of the calls by the analyst during the evaluation period based on a ratio of (i) the sum of the call success values to (ii) the sum of total available excess returns for each call by the analyst over the evaluation period, wherein the computer device calculates the analyst overall performance value, and wherein:

for each call having the first call rating for one of the securities, the call success value for the call is related to the return on the security for the call period minus the benchmark return for the call period;

for each call having the second call rating for one of the securities, the call success value for the call is zero; and for each call having the third call rating for one of the securities, the call success value for the call is related to the benchmark return for the call period minus the return on the security for the call period.

7. The method of claim 6, wherein determining the analyst overall performance value further includes weighting the contribution of each call according to the market capitalization of the rated security.

8. The method of claim 6, wherein determining the analyst overall performance value further includes equally weighting the contribution of each call.

9. The method of claim 6, further comprising computing, by the computer system, the standard deviation of returns of the securities in benchmark group for each call period of the evaluation period, and wherein the band around the benchmark return for each call period is determined based on the standard deviation.

10. A computer readable medium having stored thereon instructions which, when executed by a processor, cause the processor to:

determine a benchmark return for a benchmark group of securities within an industry sector covered by a securities analyst for each corresponding call period for calls by the analyst on securities within the benchmark group during the evaluation period, wherein a call period corresponds to a time period during the evaluation period during which the analyst has a particular rating for a security in the benchmark group, such that there are multiple call periods during the evaluation period when the analyst changes the rating on one or more securities in the benchmark group during the evaluation period, wherein calls ratings available to the analyst for each security in the benchmark group comprise a first call rating, a second call rating, and a third call rating;

compute a total available excess return for each call by the analyst during the evaluation period, wherein the total available excess return for each call is based on an absolute difference of (i) a return of the security for the call during the call period for the call and (ii) the benchmark return for the call period, except that the total available excess return equals zero for each call by the analyst having the second call rating during the call period when the security performs within a band around the benchmark return for the call period;

compute a sum of the total available excess returns for each call;

compute a call success value for each call by the analyst during the evaluation period, wherein the call success value for each call is based on a return of the security during the call period of the call to the benchmark return during the call period;

compute a sum of the call success values for each call; and compute an analyst overall performance value indicative of the success of the calls by the analyst during the evaluation period based on a ratio of (i) the sum of the call success values to (ii) the sum of total available excess returns for each call by the analyst over the evaluation period, wherein the computer device calculates the analyst overall performance value, and wherein:

for each call having the first call rating for one of the securities, the call success value for the call is related to the return on the security for the call period minus the benchmark return for the call period;

for each call having the second call rating for one of the securities, the call success value for the call is zero; and for each call having the third call rating for one of the securities, the call success value for the call is related to the benchmark return for the call period minus the return on the security for the call period.

11. The computer readable medium of claim 10, having further stored thereon instructions which, when executed by the processor, cause the processor to determine the analyst overall performance value by weighting the contribution of each call according to the market capitalization of the rated security.

12. The computer readable medium of claim 10, having further stored thereon instructions which, when executed by the processor, cause the processor to determine the analyst overall performance value by equally weighting the contribution of each call.

13. The system of claim 1, wherein the securities comprise stocks, and wherein the calls on stocks comprise stock return calls.

14. The method of claim 6, further comprising displaying the computed analyst overall performance value for the analyst on an output device.

15. The method of claim 6, further comprising outputting, to an output device in communication with the computer system, the analyst overall performance value indicative of the success of the calls by the analyst during the evaluation period.

16. The method of claim 15, wherein the outputting to an output device comprises displaying on a monitor.

17. The system of claim 1, further comprising an output device in communication with the computer system for displaying the analyst overall performance value indicative of the success of the calls by the analyst during the evaluation period.

18. The system of claim 17, wherein the output device comprises a monitor.

\* \* \* \* \*

UNITED STATES PATENT AND TRADEMARK OFFICE
CERTIFICATE OF CORRECTION

PATENT NO. : 7,610,230 B2 Page 1 of 1
APPLICATION NO. : 10/953844
DATED : October 27, 2009
INVENTOR(S) : Festog et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1042 days.

Signed and Sealed this

Twelfth Day of October, 2010

David J. Kappos
*Director of the United States Patent and Trademark Office*